United States Patent
Yuan

(10) Patent No.: US 12,420,188 B2
(45) Date of Patent: Sep. 23, 2025

(54) METHOD FOR DISPLAY CONTROL IN GAME, COMPUTER-READABLE STORAGE MEDIUM, AND ELECTRONIC DEVICE

(71) Applicant: NETEASE (HANGZHOU) NETWORK CO., LTD., Zhejiang (CN)

(72) Inventor: Bozhang Yuan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 125 days.

(21) Appl. No.: 18/257,109

(22) PCT Filed: Mar. 10, 2022

(86) PCT No.: PCT/CN2022/080225
§ 371 (c)(1),
(2) Date: Jun. 13, 2023

(87) PCT Pub. No.: WO2022/242276
PCT Pub. Date: Nov. 24, 2022

(65) Prior Publication Data
US 2024/0100429 A1    Mar. 28, 2024

(30) Foreign Application Priority Data
May 17, 2021   (CN) .......................... 202110534316.9

(51) Int. Cl.
*A63F 13/533* (2014.01)
*A63F 13/525* (2014.01)

(52) U.S. Cl.
CPC .......... *A63F 13/533* (2014.09); *A63F 13/525* (2014.09); *A63F 2300/308* (2013.01)

(58) Field of Classification Search
CPC .. A63F 13/533; A63F 13/525; A63F 13/5372; A63F 13/5378; A63F 2300/308; A63F 2300/6623
(Continued)

(56) References Cited

U.S. PATENT DOCUMENTS 9,311,750 B2 *   4/2016   Moore ................ G06F 3/04883
11,365,976 B2 *  6/2022   Colgate .................. G01C 21/28
(Continued)

FOREIGN PATENT DOCUMENTS

CN   101251964 A   8/2008
CN   108126342 A   6/2018
(Continued)

OTHER PUBLICATIONS

International Search Report dated Jun. 10, 2022 of International Application No. PCT/CN2022/080225.
(Continued)

*Primary Examiner* — Allen Chan
(74) *Attorney, Agent, or Firm* — Qinghong Xu

(57) ABSTRACT

A method for display control in a game, including: dividing, by a terminal device with a graphical user interface, at least one prompt identification into at least one group, wherein the graphical user interface displays at least one virtual object and at least one prompt identification respectively associated with a virtual object, and a prompt identification is displayed in vicinity of a corresponding virtual object determining, in a group, a sequence of a prompt identification according to position information of the prompt identification or the virtual object corresponding to the prompt identification in a game scene contained in the graphical user interface and controlling the prompt identification to display according to the group and the sequence of the prompt identification.

20 Claims, 16 Drawing Sheets

(58) Field of Classification Search
USPC .......................................................... 463/31
See application file for complete search history.

(56) References Cited

U.S. PATENT DOCUMENTS

| | | | |
|---|---|---|---|
| 11,612,809 B2* | 3/2023 | Nakamura | .......... A63F 13/2145 |
| | | | 463/31 |
| 2010/0292006 A1 | 11/2010 | Terrell et al. | |
| 2013/0237249 A1* | 9/2013 | Stewart | .............. G01C 21/3605 |
| | | | 455/456.2 |
| 2015/0117796 A1 | 4/2015 | Hile et al. | |
| 2015/0306494 A1 | 10/2015 | Pieron et al. | |

FOREIGN PATENT DOCUMENTS

| | | | |
|---|---|---|---|
| CN | 110124315 A | 8/2019 | |
| CN | 111991800 A | 11/2020 | |
| CN | 112044070 A | 12/2020 | |
| CN | 113117329 A | 7/2021 | |
| JP | 2018094382 A | 6/2018 | |
| KR | 20160017016 A | 2/2016 | |

OTHER PUBLICATIONS

Notice of Allowance dated Oct. 12, 2023, of Chinese Application No. 202110534316.9.

* cited by examiner

METHOD FOR DISPLAY CONTROL IN GAME, COMPUTER-READABLE STORAGE MEDIUM, AND ELECTRONIC DEVICE

CROSS REFERENCE TO RELATED APPLICATIONS

The present disclosure is the U.S. National Stage Application of PCT International Application No. PCT/CN2022/080225 filed on Mar. 10, 2022, which is based upon and claims priority of Chinese Patent Application No. 202110534316.9 entitled "Method for display control and apparatus in game, storage medium and electronic device", filed on May 17, 2021, the entire content of both of which is incorporated herein by reference for all purposes.

TECHNICAL FIELD

The present disclosure relates to the technical field of human-computer interaction, and particularly, to a method for display control in a game, an apparatus for display control in a game, a computer-readable storage medium, and an electronic device.

BACKGROUND

With the development of computer technology and the like, there are more and more types of electronic games. For example, in some simulation business games or strategy-based games, a player may play a role of a manager to operate and manage a virtual reality world in the game. Due to the characteristics of strong strategy, rich scene elements and the like, the games are widely loved by the public.

It should be noted that the information disclosed in the above background part is only used to enhance the understanding of the background of the present disclosure, and thus may include information that does not constitute prior art known to those of ordinary skills in the art.

SUMMARY

According to a first aspect of the present disclosure, a method for display control in a game is provided, method for display control in a game, where a graphical user interface is provided by a terminal device, the graphical user interface displays at least one virtual object and one or more prompt identifications (ID) respectively associated with the at least one virtual object, and the prompt identifications are respectively displayed in vicinity of a corresponding virtual object, and the method includes: dividing a plurality of prompt identifications into at least one group; determining, in each group, a sequence of each of the prompt identifications according to position information of each of the prompt identifications and/or the virtual object corresponding to each of the prompt identifications in a game scene contained in the graphical user interface; and controlling each of the prompt identifications to display according to the group and the sequence of each of the prompt identifications.

According to a second aspect of the present disclosure, a computer-readable storage medium is provided. The computer-readable storage medium stores with a computer program, and when the computer program is executed by a processor, any one of the above methods for display control in a game is implemented.

According to a third aspect of the present disclosure, an electronic device is provided. The electronic device includes: a processor; and a memory, configured to store an executable instruction by the processor, where the processor is configured to execute any one of the above methods for display control in a game by executing the executable instruction.

It should be understood that the above general description and the following detailed description are explanatory only and are not intended to limit the present disclosure.

BRIEF DESCRIPTION OF THE DRAWINGS

The accompanying drawings, which are incorporated in and constitute a part of the present description, illustrate embodiments consistent with the disclosure and together with the description serve to explain the principles of the disclosure. Obviously, the drawings in the following description are merely some embodiments of the present disclosure, and for those of ordinary skill in the art, other drawings can also be obtained from these drawings without creative efforts.

DETAILED DESCRIPTION

Figure 1:
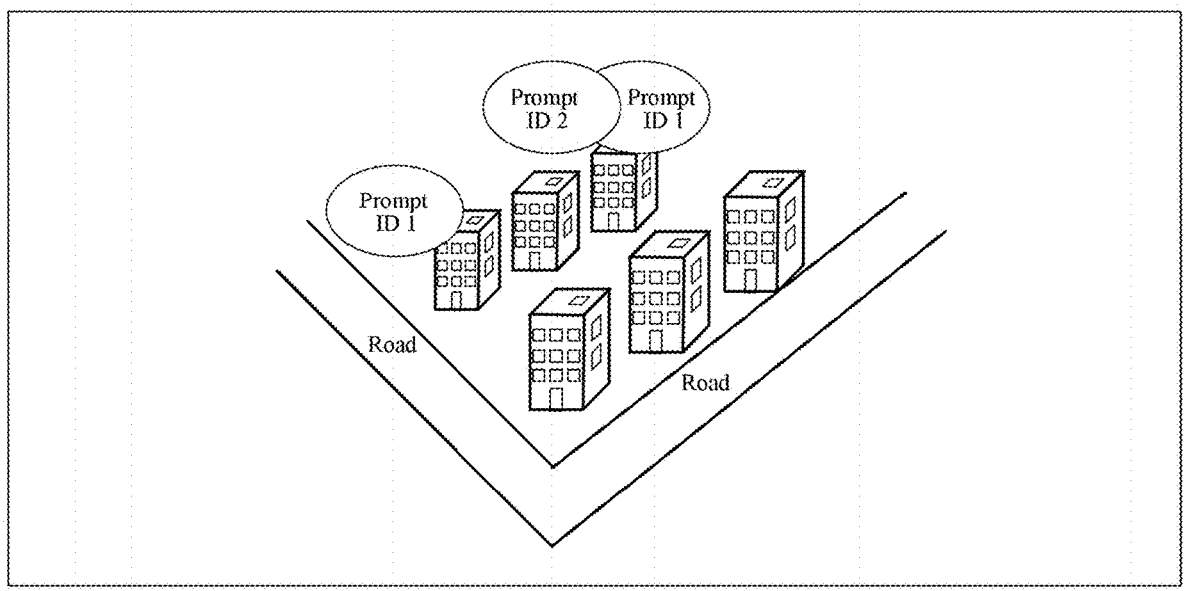
FIG. 1 is a schematic diagram of prompt identifications in related art.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The described features, structures, or characteristics may be combined in any suitable manner in one or more embodiments.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In simulation business games or strategy-based games, it is usually needed to set a prompt identification for a virtual object to prompt a player to operate the virtual object, such as collecting a virtual item generated by the virtual object. However, with the continuous advancement of the game process, the number of virtual objects and the virtual items generated by the virtual objects in the game scene is continuously increased, so that the number of prompt identifications of the virtual objects is continuously increased. Sometimes, the problem that the prompt identifications overlap with each other and the game scene is blocked, may occur, especially when the display scale of the game scene is smaller. It brings a larger information pressure to the player, and the visual effect of the game becomes poor.

In one solution of the related art, referring to FIG. 1, the distance between the virtual objects in the game scene can be increased to control the density of the prompt identifications of the virtual objects. Meanwhile, the scaling of the game scene is limited to control the number and the overlapping degree of the prompt identifications displayed in the game scene. However, in this method, when the represented number of obtained items is larger, the problem of prompt identifications overlapping with each other and blocking the game scene will still arise, and the player cannot browse and plan the layout of the virtual objects in the game scene more macroscopically, and the freedom degree of the player for playing the game is greatly reduced. In addition, the above method cannot be applied to a game with a large density of the virtual objects.

Figure 2A:
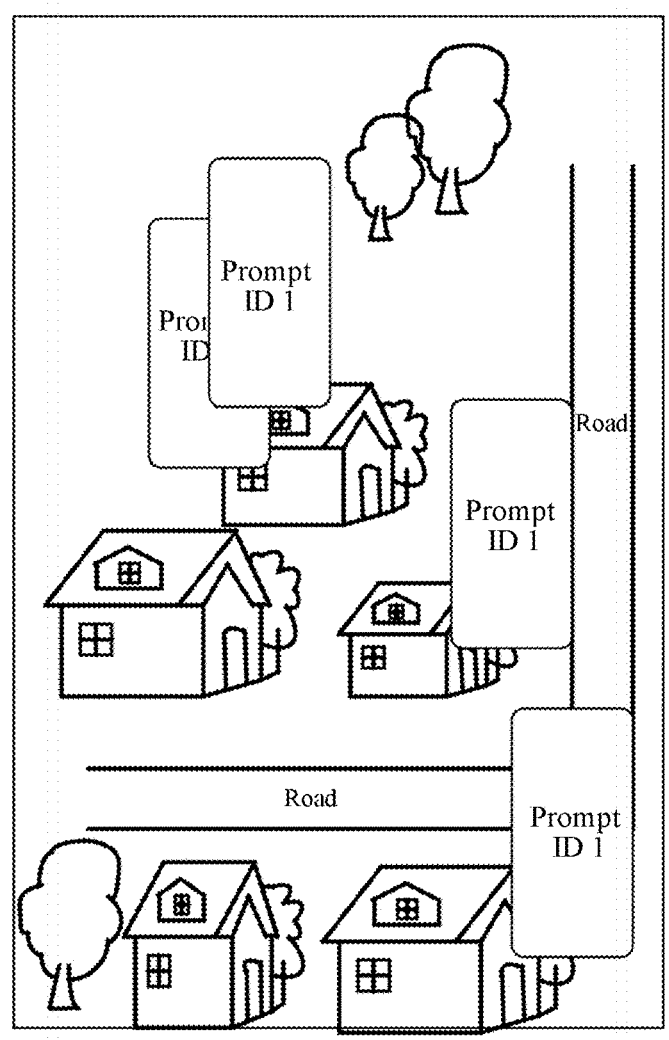
FIGS. 2A and 2B show a schematic diagram of prompt identifications in another related art.
Figure 2B:
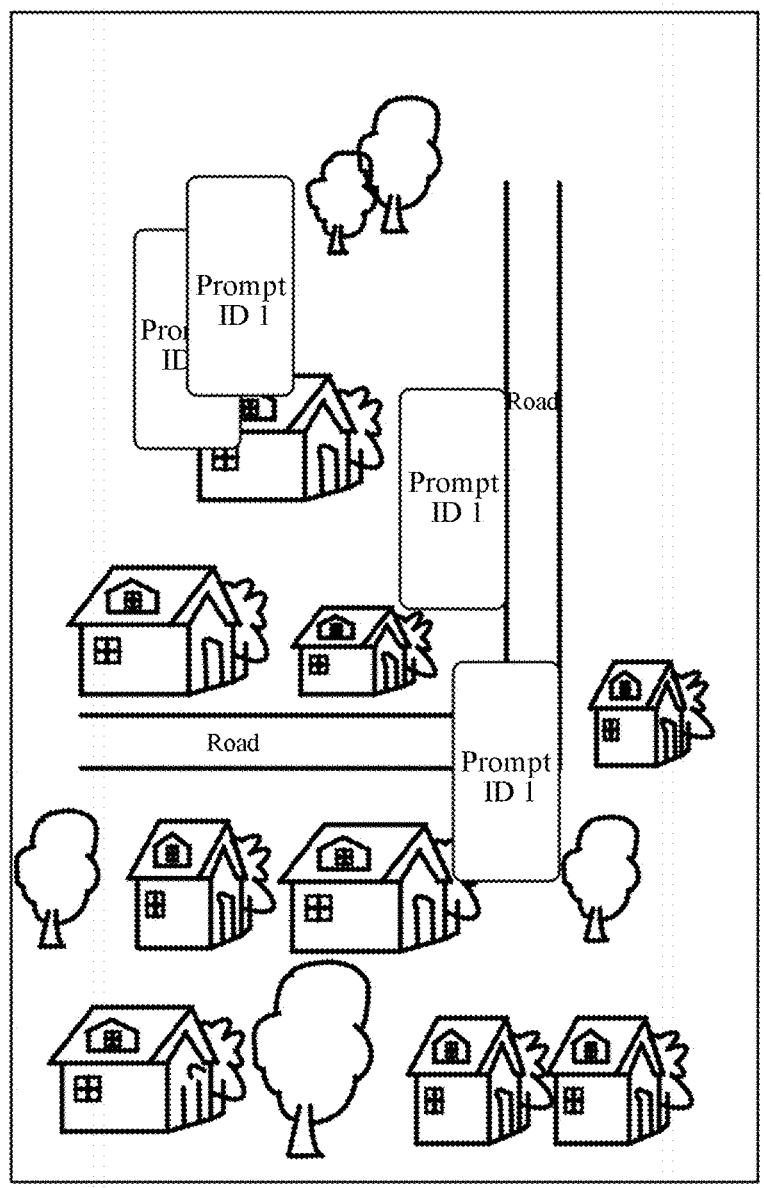

In another solution of the related art, the prompt identifications of the virtual objects may be set in the game scene for display, and along with zooming of the game scene, the prompt identifications may also be scaled. For example, FIG. 2A shows a schematic interface diagram of prompt identifications. After the display scale of the game scene is zoomed, a game scene as shown in FIG. 2B is presented. It can be seen that, when the game scene is zoomed to a smaller scale, the size of the prompt identification becomes very small, and it is difficult for the player to recognize and distinguish different prompt identifications.

The present disclosure provides a method for display control in a game, an apparatus for display control in a game, a computer-readable storage medium and an electronic device, so as to improve the poor visual display effect of the prompt identification at least to a certain extent.

The present disclosure firstly provides a method for display control in a game applied to a terminal device. Among them, the terminal device may be an electronic device having a display screen, for example, may be a desktop or a portable computer, a smart phone, a tablet computer, a portable gaming machine, or the like. In some embodiments, a graphical user interface may be provided by a terminal device, the graphical user interface may be obtained by a processor of the terminal device executing a game application and rendered on a display of the terminal device. The graphical user interface may display at least one virtual object and one or more prompt identifications respectively associated with the virtual object, and each of the prompt identifications may be respectively displayed in vicinity of the corresponding virtual object. Among them, the vicinity of the virtual object may be a region within a preset range of the virtual object, for example, may be a region of the virtual object within a certain distance range. For example, for the virtual object a, the corresponding prompt identification may include x1, x2 and x3, and for the virtual object b, the corresponding prompt identification may include y1, y2, y3 and y4. When each of the prompt identifications is displayed, the prompt identification may be displayed in the adjacent region of the virtual object, for example, the prompt identification may be attached to the upper left corner or the upper right corner of the virtual object for display.

The virtual object refers to a game character operated by a player or not operated by a player in a game, and may include a road, a building, an animal and a plant, etc. The prompt identification may be used for prompting the player to perform some operation on the virtual object, for example, for prompting the player may to upgrade the virtual object, or for prompting the player to obtain a certain virtual item corresponding to the virtual object. For example, in some city simulation games, the "farm" may be used to produce a plurality of "crop", such as "wheat", "rice", etc. In this case, the "crop" corresponding to the virtual object "farm", i.e. the "wheat", the "rice", etc., is the virtual item corresponding to it. And in this case, the prompt identification of the virtual item may be used to prompt the player to collect a corresponding "crop" to increase the number of the "crop".

Figure 3:
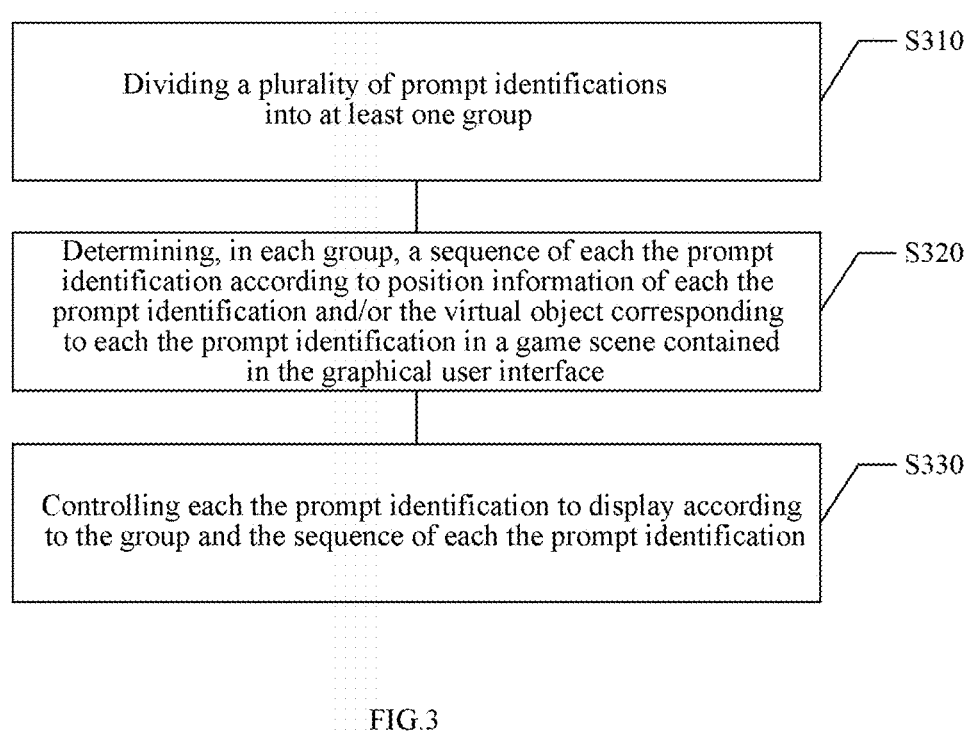
FIG. 3 is a flowchart of a method for display control in a game according to an embodiment of the present disclosure.

FIG. 3 shows a process according to an embodiment of the present disclosure, which may include the following steps S310-S330:

In step S310, a plurality of prompt identifications are divided into at least one group.

In some embodiments, one virtual object may correspond to one or more prompt identifications. When the number of virtual objects is larger or the number of prompt identifications of the virtual objects is larger, the prompt identifications may be divided into a plurality of groups according to corresponding division standard. The division standard may be pre-configured by an operator, or may also be set by players according to their own usage habits.

In an embodiment, each group may be distinguished from each other for display by the same or similar appearance, contour, color, brightness, etc. For example, the group A includes two prompt identifications, and the group B includes three prompt identifications. Then, letters or characters may be used for distinguishing, for example, A1 and A2, B1, B2 and B3. Different shapes may also be using for distinguishing; for example, the two prompt identifications in group A are displayed using circular identifications, and each of the prompt identifications is distinguished within the group by a LOGO; the three prompt identifications in group B are displayed using square identifications, and each of the prompt identifications is distinguished within the group by a LOGO.

Specifically, in an embodiment, the plurality of prompt identifications may be grouped according to a preset rule. The preset rule may include any one of the following:

(1) The prompt identifications of each virtual object are divided into one group. For example, when one virtual object corresponds to a plurality of virtual items, the prompt identifications of all the virtual items associated with the virtual object may be divided into one group. Among them, each virtual item may include one or more prompt identifications, and each of the prompt identifications may be used to indicate different prompt information.

(2) The prompt identifications of the virtual objects belonging to a same category are divided into one group according to the category of the virtual objects. Specifically, the prompt identifications of the virtual objects belonging to the same category can be divided into one group according to the category of the virtual objects, where the category of the virtual objects may be preconfigured by the operator according to the attribute of the virtual objects.

Figure 4:
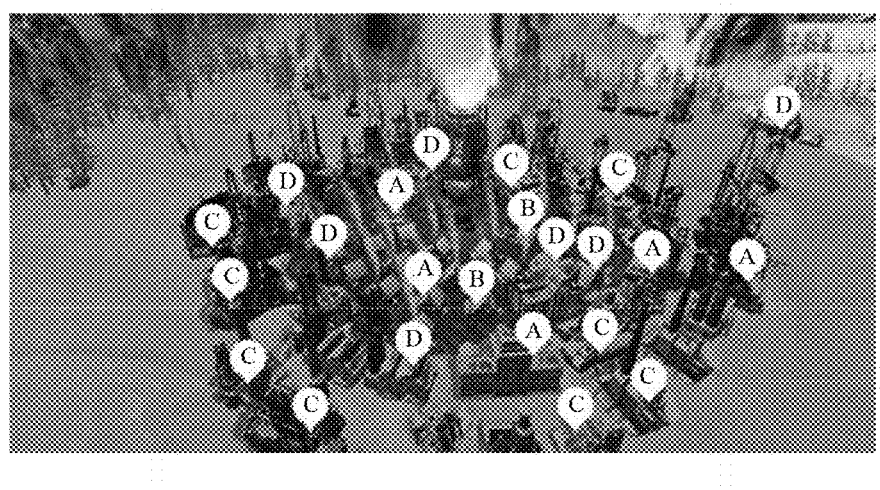
FIG. 4 is a schematic diagram of dividing the category of prompt identifications according to an embodiment of the present disclosure.

For example, in the above city simulation games, it can include various categories of virtual objects such as "house", "road", "plans", etc. The prompt identifications of all the virtual objects belonging to a corresponding category may be divided into one group according to the categories of these virtual objects. For example, the prompt identifications of virtual objects such as "farming house", "large building" and "villa" belonging to the category of "house" may be divided into one group. For another example, referring to FIG. 4, prompt identifications belonging to different categories of "production building" can be divided according to the categories of "production building". As shown in the drawings, the categories of "production building" in the game scene include four types A, B, C and D, and each "production building" may generate and display one or more prompt identifications, so that the prompt identifications of the virtual object may also be correspondingly divided into four groups of A, B, C and D.

(3) According to the identification category of each of the prompt identifications, the prompt identifications with the same identification category are divided into one group. Among them, the identification category refers to an inherent attribute of the prompt identification, and may be configured by an operator during game development. For example, the identification category may represent a specific virtual item, and all prompt identifications of the virtual item with the same identification category may be divided into one group. That is, for different virtual objects, the identification category of the corresponding prompt identification may also be the same, so that the prompt identifications having the same identification category corresponding to different virtual objects may be divided into one group.

In an embodiment, the prompt identifications of the virtual object in a certain region may be divided into one group according to the position of the virtual object in the game scene. For example, for a plurality of virtual objects with the geographic location being at "seaside", the prompt identifications corresponding to these virtual objects may be divided into one group.

It should be noted that the method for dividing a plurality of prompt identifications into different groups is merely an example, and in practical applications, different division rules of prompt identifications can be set, which is not specifically limited in the embodiments.

By dividing the plurality of prompt identifications into at least one group, the prompt identifications of each virtual object in the game scene can be effectively integrated, and the information structure of the prompt identification in the game is optimized.

In step S320, in each group, the sequence of each of the prompt identifications is determined according to position information of each of the prompt identifications and/or the virtual object corresponding to each of the prompt identifications in the game scene included in the graphical user interface.

Among them, the graphical user interface is a computer-operated user interface displayed in a graphical manner, and may include a game scene, an operation control in the game, and the like. The position information of the prompt identification in the game scene may include coordinate information of the prompt identification in the game scene, etc.

After the prompt identification is divided into a plurality of groups, the sequence of the prompt identifications in each group can be determined in each group according to the position information of each of the prompt identifications or the virtual object corresponding to each of the prompt identifications in the game scene. Specifically, a distance between each of the prompt identifications or the virtual object corresponding to each of the prompt identifications and a certain fixed point in the game scene may be determined according to the position information of each of the prompt identifications or the virtual object corresponding to each of the prompt identifications in the game scene, so as to determine the sequence of each of the prompt identifications, where the fixed point may be any point in the game scene.

In an embodiment, the sequence of each of the prompt identifications is determined according to the position information of each of the prompt identifications in the game scene included in the graphical user interface. Among them, the position information of each of the prompt identifications in the game scene is obtained, the distance between the position of each of the prompt identifications and a certain fixed point in the game scene is determined, and the sequence of each of the prompt identifications is determined.

In an embodiment, the sequence of each of the prompt identifications is determined according to the position information of the virtual object corresponding to each of the prompt identifications in the game scene included in the graphical user interface. Among them, each virtual object includes one or more corresponding prompt identifications, and these prompt identifications are attached to each virtual object and displayed in vicinity of each virtual object, by taking each virtual object as an anchor point. Thus, the position information of each virtual object in the game scene is obtained, the distance between the position of each virtual object and a certain fixed point in the game scene is determined, and the sequence of each of the prompt identifications is determined.

In an embodiment, the sequence of each of the prompt identifications is determined according to the position information of each of the prompt identifications and the virtual object corresponding to each of the prompt identifications in the game scene included in the graphical user interface. Among them, each virtual object includes one or more corresponding prompt identifications, and these prompt identifications are attached to each virtual object and displayed in vicinity of each virtual object, by taking each virtual object as an anchor point. At the same time, it is considered that there may be overlapping block among the plurality of prompt identifications, so that, the position information of each of the prompt identifications and the virtual object corresponding to each of the prompt identifications in the game scene is obtained, and the distance between each of the prompt identifications and the virtual object corresponding to each of the prompt identifications and a certain fixed point in the game scene is determined, so as to determine the sequence of each of the prompt identifications. By performing the same consideration on the position information of each of the prompt identifications and each virtual object, in the sorting process, it can be more objective and greatly reduce the possibility of overlapping prompt identifications.

In an embodiment, step S320 may be implemented by the following method:
- a reference distance of each of the prompt identifications is determined according to the position information in the game scene of each of the prompt identifications or the virtual object corresponding to each of the prompt identifications;
- the reference distance of each of the prompt identifications is sorted in an ascending order, and the sequence of each of the prompt identifications is determined according to the sequence obtained after sorting.

Among them, the reference distance of each of the prompt identifications may be determined by the distance between the prompt identification or the virtual object corresponding to the prompt identification and a preset position in the game scene. The preset position in the game scene may be any point in the game scene, for example, may be a center point in the game scene. The reference distance may be used to indicate the distance between the prompt identification and the preset position in the game scene.

Figure 5:
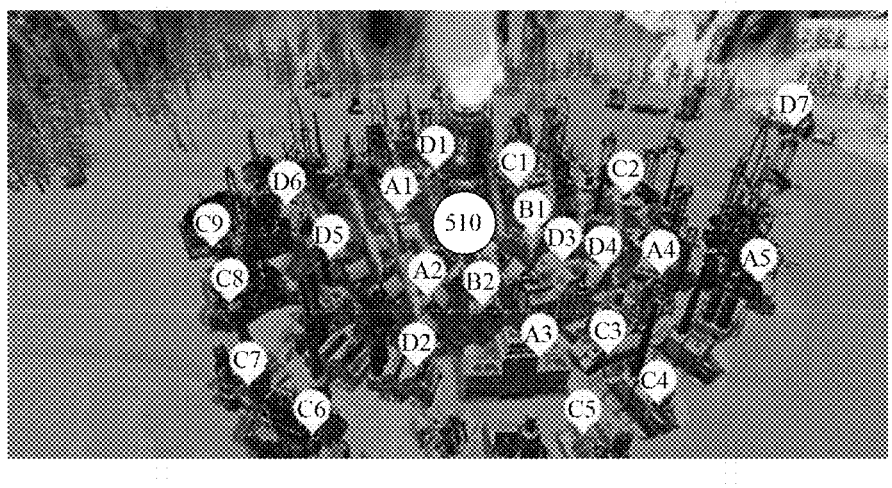
FIG. 5 is a schematic diagram of a prompt identification according to an embodiment of the present disclosure.

Referring to FIG. 5, for A, B, C, and D four types of "production building" displayed in the game scene, the reference distance of the prompt identification of each group can be sorted in an order from small to large according to the distance between each of the prompt identifications in each group and the center point 510 in the game scene, so that the sequence obtained after sorting is used as the sequence of the plurality of prompt identifications, and the sequence of each of the prompt identifications is determined accordingly. Taking prompt identifications of the group A as an example, the prompt identifications A1, A2, A3, A4 and A5 may be displayed in the game scene according to the distance between each of the prompt identifications corresponding to the group A and the center point of the game scene, where the numeral may indicate the sequence of corresponding prompt identification. It can be seen that, the closer the distance is, the higher the sequence is. By means of the method, optimization of the data hierarchy and structure of the prompt identification can be realized.

Through the above step S320, the sequence of each of the prompt identifications can be determined according to the position of the prompt identification in the game scene, which helps to positioning the position of each of the prompt identifications. When the number of the prompt identifications is larger, the time for the player to position the prompt identifications can be greatly reduced.

In step S330, each of the prompt identifications is controlled to display according to the group and the sequence of each of the prompt identifications.

After determining the group and the sequence of each of the prompt identifications, the group or the sequence of each of the prompt identifications may be displayed in the graphical user interface. Therefore, the player can quickly determine the content and the position of the prompt identification of each virtual object, facilitating the player to select the corresponding prompt identification for operation. Thus, the operation efficiency of the player can be improved, and the display effect of the prompt identification in the game can be optimized.

In order to facilitate the player to determine the group and the position of each of the prompt identifications at the same time, in an embodiment, each of the prompt identifications in each group may be displayed as an information combination composed of the group and the sequence of the prompt identification, when each of the prompt identifications is displayed. For example, with continued reference to FIG. 5, each of the prompt identifications is displayed as a bubble shape, and the group and the sequence of the prompt identification may be displayed in the bubble. Therefore, the player can determine the group and the sequence of the prompt identification according to the content displayed in the prompt identification, and determine which virtual item it belongs to, so as to quickly determine the prompt identification that the player wants to select. Especially when the number of the prompt identifications is larger, the time required for the player to search the prompt identification can be greatly reduced, and the accuracy and efficiency of player operation are improved.

Furthermore, when the number of the prompt identifications displayed in the graphical user interface is larger, if all prompt identifications are displayed, more display areas can be occupied, and excessive occlusion can be generated on the game scene. When the number of the displayed same prompt identifications is larger, greater information pressure can also be brought to the player, so that it is difficult to recognize and distinguish different prompt identifications. Therefore, in an embodiment, the following method may be further performed:

A representative identification of the prompt identifications of any group is displayed. Among them, the representative identification may be used to indicate a prompt identification of a group, for example, may be a prompt identification having a minimum sequence value in any group. In addition, the representative identification may also be other types of identification information, for example, may be an identification formed by combination of the group and the number of the prompt identification of the group, or may be a shape identification that can uniquely represent a prompt identification of a certain group, etc.

By means of the method, the representative identification is used to indicate the prompt identifications of one group in the game scene, so that the omission display of the prompt identifications of one group is realized. Therefore, the number of prompt identifications in the game scene can be greatly reduced, and the visual effect of the game scene is improved.

In addition, in some cases, a condition for displaying the representative identification may also be set to trigger the omission display of the prompt identifications. For example, in an embodiment, when the number of prompt identifications of any group is greater than a number threshold or a display scale of the game scene is less than a scale threshold, the representative identification of the prompt identifications of any group may be displayed. Among them, the number threshold and the scale threshold may be configured by an operator according to game content and the like. For example, the number threshold may be set to 10, and the scale threshold is set to 0.5.

Figure 6:
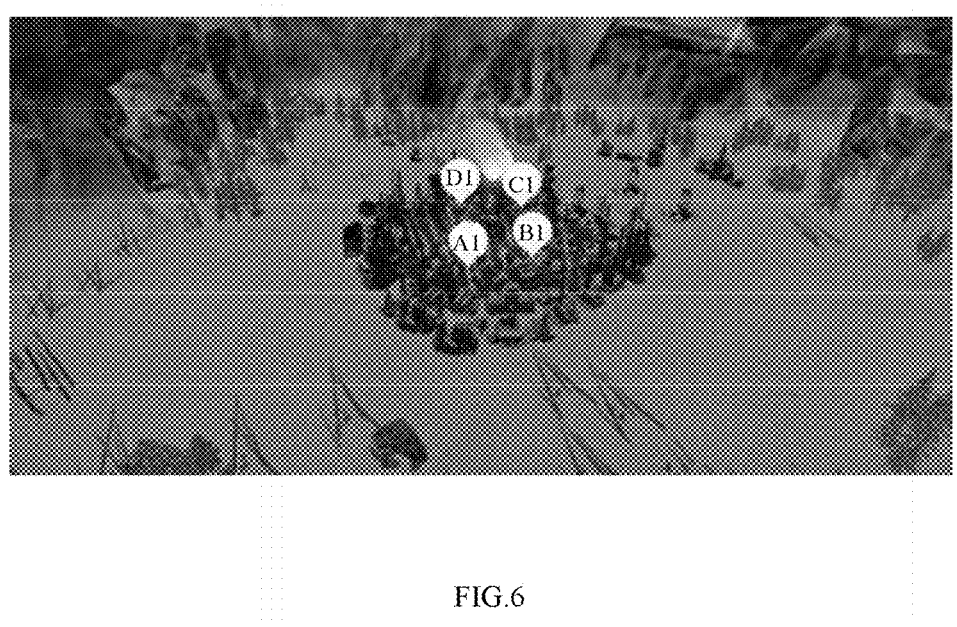
FIG. 6 is a schematic diagram of a game scene that is zoomed and displayed according to an embodiment of the present disclosure.
Figure 7:
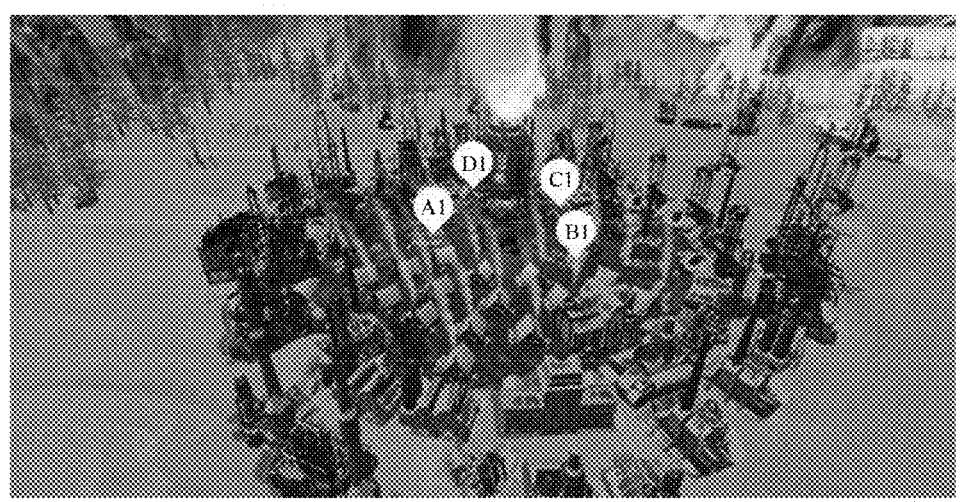
FIG. 7 is a schematic diagram of a representative identification according to an embodiment of the present disclosure.

In fact, when the display scale of the game scene is smaller, as shown in FIG. 6, the game scene displayed in the game scene has a larger range, and the player can perform a layout planning with a larger range. In this case, if all the prompt identifications are displayed, it is difficult for the player to recognize and distinguish each of the prompt identifications. Therefore, when the number of prompt identifications of any group is greater than the number threshold or the display scale of the game scene is smaller than the scale threshold, the number of the displayed prompt identifications can be reduced, and the prompt identifications may be converted into the omission display. Specifically, in the graphical user interface, the display of each of the prompt identifications in the above any group can be hidden, and the representative identification of the prompt identifications of the group is displayed. The representative identification may be a prompt identification with the minimum sequence value in the above any group, that is, the prompt identification with the highest sorting in the group. For example, referring to FIG. 7, for the game scene as shown in FIG. 5, when the number of the prompt identifications of any group is greater than 2, the prompt identifications of the group can be performed omission display, that is, the prompt identification with the highest sorting in the group is displayed. As shown in the figure, in the case of omission display, only four prompt identifications are displayed in the game scene, that is, A1, B1, C1 and D1.

By means of the above method, the number of prompt identifications displayed in the graphical user interface can be reduced when the number of the prompt identifications is larger or the display scale of the game scene is smaller, so that the prompt identification appears in the visual range as much as possible, the display area of the game scene is increased, and the display size of the prompt identification can also be ensured. For a player, it is very easy to distinguish the prompt identifications and the position where the prompt identifications are located, and it is not prone to ignore the prompt identifications, thus improving the error prevention performance of the game.

Furthermore, in the embodiments, the game scene may be a scene captured by the virtual camera in the game scene, and when the position or the shooting angle of the virtual camera changes, the game scene may also change. Therefore, in an embodiment, when the position or the shooting angle of the virtual camera changes, the sequence of each of the prompt identifications in the group corresponding to the representative identification can be updated according to the game scene captured by the changed virtual camera. Specifically, the position information of each of the prompt identifications in the group corresponding to each representative identification can be determined according to the game scene captured by the changed virtual camera, and the sequence of each of the prompt identifications is re-determined according to the position information. After updating the sequence of each of the prompt identifications, the representative identification in each group may be re-determined. For example, the prompt identification having the minimum sequence value in each group may be re-determined, so as to obtain a new representative identification and display it.

Figure 8A:
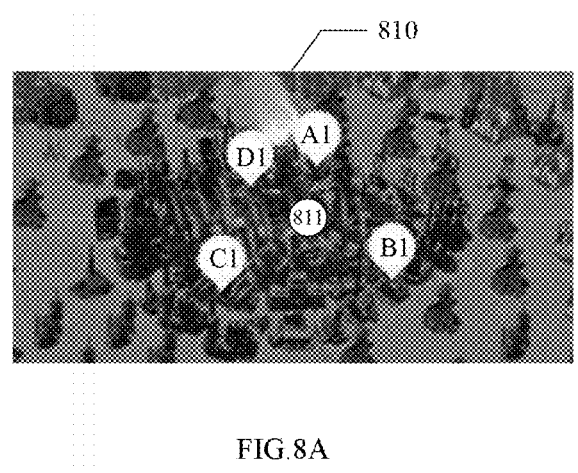
FIGS. 8A and 8B show a schematic diagram of updating the sequence of prompt identifications according to an embodiment of the present disclosure.
Figure 8B:
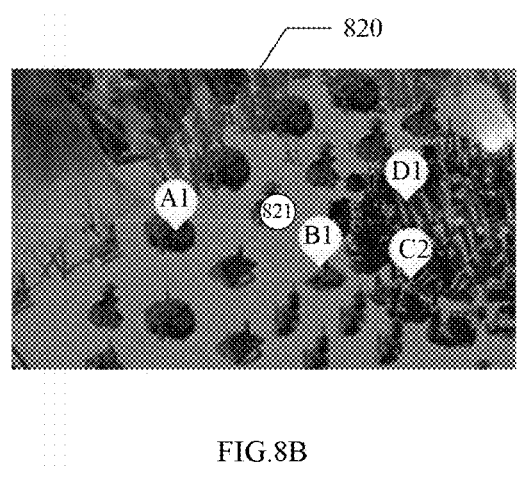

For example, the center point of the new game scene can be determined according to the game scene captured by the changed virtual camera, and the distance between each of the prompt identifications and the center point in the new game scene is calculated to update the sequence of each of the prompt identifications. Referring to FIG. 8A, the center point of the game scene 810 is 811. After the position of the virtual camera changes, as shown in FIG. 8B, the game scene 820 is switched and displayed in the graphical user interface, and the center point of the game scene corresponding to the game scene 820 is 821. At this time, the distance between each of the prompt identifications in the groups corresponding to the representative identifications A1, B1, C1, and D1 and the center point of the new game scene, i.e. 821, can be calculated respectively to update the sequence of each of the prompt identifications in the group corresponding to each representative identification. After updating the sequence of each of the prompt identifications, the representative identification of each group may be re-determined according to the sequence. As shown in the figure, when the center point of the game scene is switched from 811 to 821, the position of the representative identification changes, and the representative identification of the prompt identifications of the group C is updated from C1 to C2.

By means of this method, when the game scene changes, the sequence of each of the prompt identifications can be updated in time.

Figure 9A:
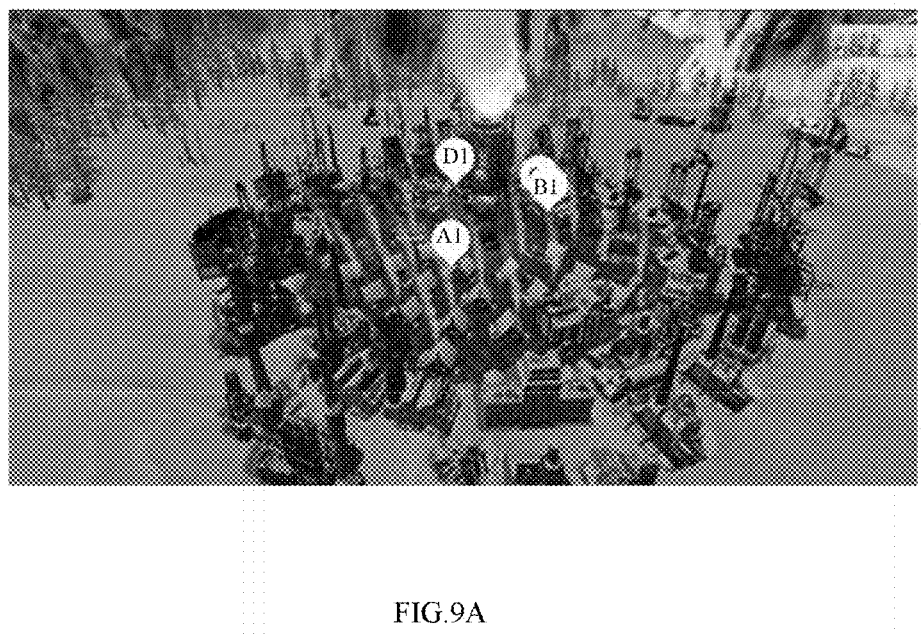
FIGS. 9A and 9B show a schematic diagram of another representative identification according to an embodiment of the present disclosure.
Figure 9B:
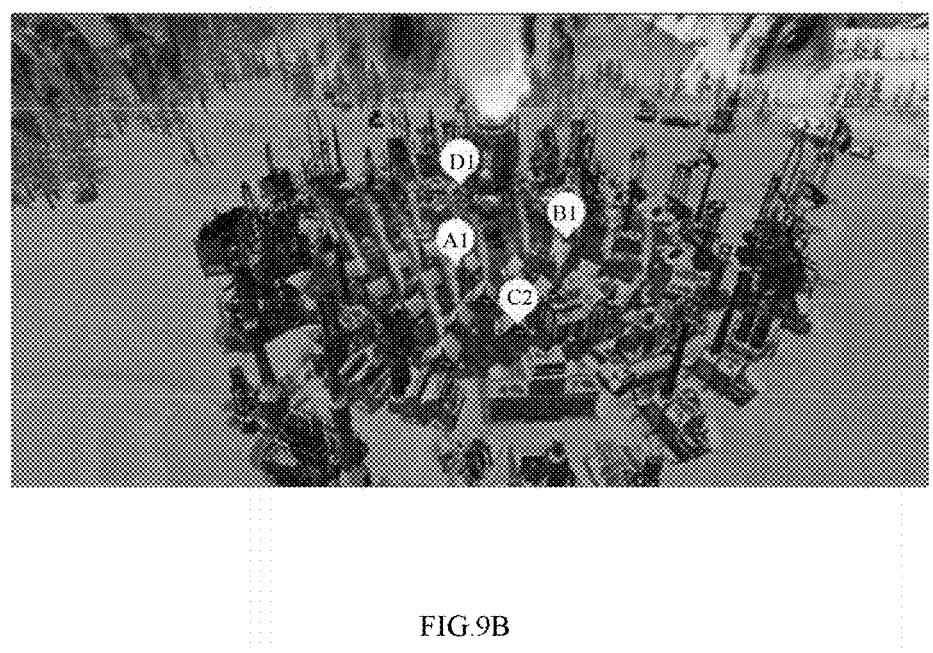

Considering the problem that there may be mutual occlusion of the representative identifications, in order to reduce the influence of the blocked representative identification on the game scene, in an embodiment, it can be determined that whether the representative identification is blocked according to the position information of the representative identification in the game scene. When it is determined that the representative identification is blocked, sorting degradation processing is performed on the prompt identification corresponding to the blocked representative identification, and the sequence of each of the prompt identifications in the above any group is determined, so that a new representative identification is determined according to the sequence of each of the prompt identifications in the above any group, so as to perform display. Referring to FIG. 9A, the representative identification is a prompt identification having a minimum sequence value in a corresponding group, and each representative identification is displayed as identification information composed of the group and the sequence. The representative identification C1 is blocked by B1, and in this case, sorting degradation may be performed on the blocked prompt identification, i.e. the prompt identification C1. For example, the sequence of the prompt identification C1 may be updated to 2, so that the prompt identification C2 may be used as a new representative identification. As shown in FIG. 9B, the prompt identification C1 is no longer displayed, and a new representative identification C2 is displayed. By performing sorting degradation processing on the blocked representative identification, the prompt identification that is not blocked and with the highest sorting in each group can be determined, so that it can be ensured that the representative identification displayed in the graphical user interface is not blocked, avoiding the possibility that the blocking information interferes with the player operation.

In some embodiments, the prompt identification and the representative identification may both be used to increase the attribute value of the virtual object. The attribute value of the virtual object may be an attribute value of the virtual object itself, for example, may be a grade of the virtual object or the like. Or, it may be an attribute value of a virtual item corresponding to the virtual object, for example, may be a quantity, a yield, a life value, and the like of a certain virtual item owned by the virtual object. Therefore, in an embodiment, when the representative identification of the prompt identification of any group is displayed, the following method may further be executed:

In response to a first preset operation on the representative identification, an attribute value of the virtual object indicated by the representative identification is adjusted;

In the prompt identifications in any group other than the representative identification, the prompt identification with the minimum sequence value is determined as the new representative identification, and the new representative identification is displayed.

Among them, the first preset operation refers to the operation that the player adjusts the attribute value of the virtual object corresponding to the representative identification, for example, it may be the operation that the player clicks the representative identification.

Figure 10:
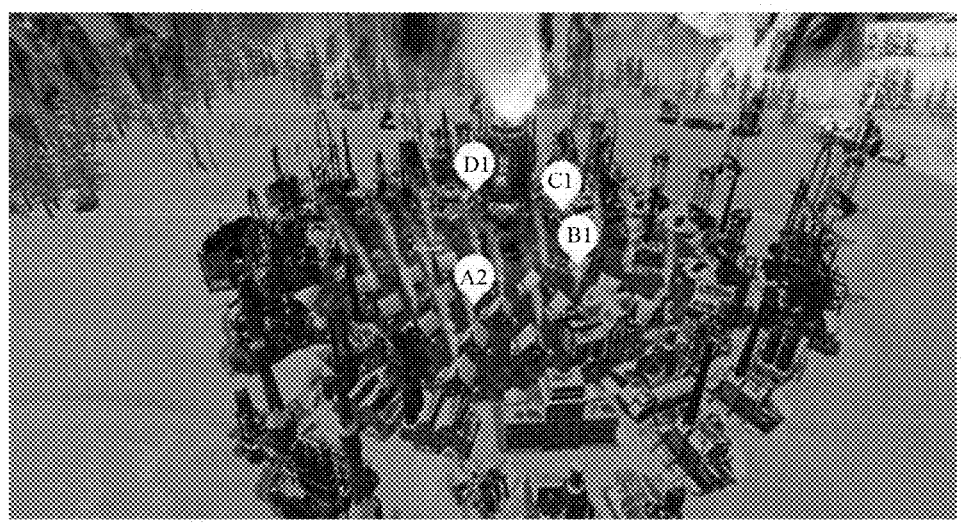
FIG. 10 is a schematic diagram of still another representative identification according to an embodiment of the present disclosure.

When the first preset operation of the player on the representative identification is received, the attribute value of the virtual object indicated by the representative identification may be adjusted. For example, the virtual object may be upgraded according to the upgrade value indicated by the representative identification, or the number value of the virtual object indicated by the representative identification about a certain virtual item may also be adjusted. For example, the virtual items of the number value indicated by the representative identification are obtained, and the number value is increased on the basis of the total number value of the virtual items in the game, so as to determine the new total number value of the virtual items in the game. Then, the next prompt identification in the group can be sequentially displayed according to the sequence of the prompt identifications of the corresponding group. As shown in FIG. 10, in the game scene as shown in FIG. 9, after the player triggers the first preset operation on the representative identification A1, the corresponding virtual object can be controlled to increase the attribute value of the virtual item corresponding to A1, and the next prompt identification of the prompt identifications in group A is displayed in sequence, that is, A2.

In an embodiment, when the attribute value of the virtual object corresponding to each of the prompt identifications is adjusted in sequence through the above method, it can be determined that whether the number of all prompt identifications of the group to which the prompt identification belongs at the current moment is greater than the number threshold or not when each of the prompt identifications is displayed. If the number is greater than the number threshold, the representative identification of the prompt identifications of the group can be continuously displayed. If the number is not greater than the number threshold, the representative identification of the prompt identifications of the group can be stopped display, and all prompt identifications in the prompt identifications of the group are displayed. That is, when the attribute value of the virtual object corresponding to each of the prompt identifications is sequentially adjusted according to the sequence, the next prompt identification may be sequentially displayed after the attribute value of the virtual object indicated by the representative identification is adjusted, until the condition of displaying the representative identification is no longer met.

Furthermore, in order to improve the operation efficiency of the player, in an embodiment, when the representative identification of the prompt identification of any group is displayed, the following method may further be executed:

In response to a second preset operation on the representative identification, the attribute value of the virtual object corresponding to each of the prompt identifications in the group corresponding to the representative identification is adjusted, and the display of the representative identification is canceled.

Among them, the second preset operation is an operation of adjusting the attribute value of the virtual object corresponding to each of the prompt identifications in the group corresponding to the representative identification. For example, it may be an operation of the player dragging the representative identification to move in a certain direction.

When a second preset operation of the player on the representative identification is received, the attribute value of the virtual object corresponding to each of the prompt identifications in the group corresponding to the representative identification can be adjusted. For example, the virtual object corresponding to each of the prompt identifications in the group corresponding to the representative identification can be controlled to be upgraded, or the virtual object associated with the representative identification in the game scene can also be controlled to obtain the virtual items corresponding to each of the prompt identifications in the group indicated by the representative identification, and the number or yield of the virtual object on the virtual item is increased. For example, the virtual item in the group indicated by the representative identification is obtained, and the number value of the virtual item in the group is increased on the basis of the total number value of the virtual item in the game, so as to determine the new total number value of the virtual item in the game. For example, in the game scene as shown in FIG. 10, when the player triggers a second preset operation on the representative identification B1, the corresponding virtual object may be controlled to increase the number of the virtual item corresponding to the prompt identifications of group B, so as to achieve batch obtaining of the virtual item corresponding to the prompt identifications of a certain group. After batch obtaining is completed, the display of the corresponding prompt identification in the graphical user interface may be hidden.

Through the above method, one-click operation on one type of prompt identifications can be realized, for example, one-click obtaining of a plurality of virtual items can be realized, and the operation convenience and the operation efficiency of playing the game by the player are improved.

Furthermore, in the above method, when the game is developed, the operator may select whether to start a batch selection function of the prompt identification. For example, the operation mode of the representative identification may be set as a default operation, that is, as long as the selection operation of the player on the representative identification is received, the attribute value of one virtual object indicated by the representative identification is adjusted by default, or the attribute value of the virtual object corresponding to each of the prompt identifications in the group indicated by the representative identification is adjusted by default. In addition, the functions of individually adjusting the attribute value of the virtual object through the representative identification and adjusting the attribute value of the virtual object in batches through the representative identification can be set in the game at the same time. For example, the player can select to start the function of individually adjusting the attribute value of the virtual object and the function of adjusting the attribute value of the virtual object in batches at the same time, and different operation modes are set to control the representative identification to execute the corresponding function. In this way, the operation flexibility of the representative identification can be enhanced, and the requirement of the player for customizing the game operation mode is met.

To sum up, according to the method for display control in the game in the embodiments, the plurality of prompt identifications can be divided into at least one group; in each group, the sequence of each of the prompt identifications is determined according to the position information of each of the prompt identifications or the virtual object corresponding to each of the prompt identifications in the game scene contained in the graphical user interface; and each of the prompt identifications is controlled to display according to the group and the sequence of each of the prompt identifications. On one hand, each of the prompt identifications is controlled to display according to the category and the sequence of each of the prompt identifications, so that the number of prompt identifications displayed in the game scene can be reduced, the repetition degree of the prompt identifications is reduced, the display area of the game scene is increased, the cognitive cost of the player on the prompt identification can be reduced, and the visual effect of displaying the game scene is improved. On the other hand, the plurality of prompt identifications are divided into at least one group, so that the prompt identification can be integrated, and the information structure of the prompt identification is optimized. On another hand, the embodiments can be implemented by a program without the need for an additional interface carrier. It can provide an intuitive interface display effect for the player, and has higher portability and expandability.

Figure 11:
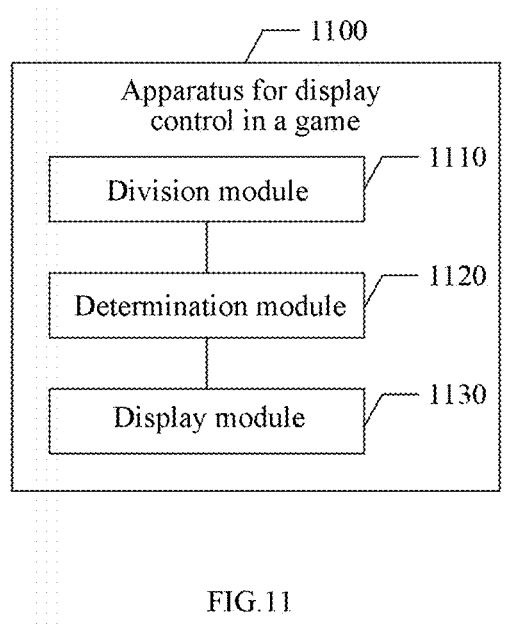
FIG. 11 is a structural block diagram of an apparatus for display control in a game according to an embodiment of the present disclosure.

The present disclosure further provides an apparatus for display control in a game, where a graphical user interface is provided by a terminal device, the graphical user interface displays at least one virtual object and one or more prompt identifications respectively associated with the at least one virtual object, and the prompt identifications are respectively displayed in vicinity of the corresponding virtual object. As shown in FIG. 11, the apparatus 1100 for display control in the game may include: a division module 1110, configured to divide the plurality of prompt identifications into at least one group; a determination module 1120, configured to determine a sequence of each of the prompt identifications according to the position information of each of the prompt identifications and/or the virtual object corresponding to each of the prompt identifications in the game scene included in the graphical user interface in each group; and a display module 1130, configured to control each of the prompt identifications to display according to the group and the sequence of each of the prompt identifications.

In an embodiment of the present disclosure, the division module 1110 may be configured to group a plurality of prompt identifications according to a preset rule, where the preset rule includes any one of the following: dividing the prompt identifications of each virtual object into one group; dividing the prompt identifications of the virtual object belonging to a same category into one group according to the category of the virtual object; and dividing the prompt identifications with the same identification category into one group according to the identification category of each of the prompt identifications.

In an embodiment of the present disclosure, the determination module 1120 may be configured to determine a reference distance of each of the prompt identifications according to the position information of each of the prompt identifications and/or the virtual object corresponding to each of the prompt identifications in the game scene, sort the reference distance of each of the prompt identifications in an ascending order, and determine the sequence of each of the prompt identifications according to the sequence obtained after sorting; where the reference distance of each of the prompt identifications is determined by a distance between the prompt identification and/or the virtual object corresponding to the prompt identification and a preset position in the game scene.

In an embodiment of the present disclosure, the display module 1130 may be configured to display each of the prompt identifications in each group as an information combination composed of the group and the sequence of the prompt identification.

In an embodiment of the present disclosure, when controlling each of the prompt identifications to display, the display module 1130 may be configured to display a representative identification of the prompt identifications of any group, where the representative identification includes a prompt identification having a minimum sequence value in any group.

In an embodiment of the present disclosure, the display module 1130 may be configured to display the representative identification of the prompt identifications of any group when the number of the prompt identifications of any group is greater than a number threshold or a display scale of the game scene is less than a scale threshold.

In an embodiment of the present disclosure, the display module 1130 may be further configured to, when the position and/or the shooting angle of the virtual camera are changed, update the sequence of each of the prompt identifications in the group corresponding to each representative identification according to the game scene captured by the changed virtual camera.

In an embodiment of the present disclosure, when the representative identification of the prompt identifications of any group is displayed, the display module 1130 may be further configured to determine, whether the representative identification is blocked or not, according to the position information of the representative identification of the prompt identifications of any group in the game scene. When it is determined that the representative identification is blocked, sorting degradation processing is performed on the prompt identifications corresponding to the blocked representative identification, and the sequence of each of the prompt identifications in any group is determined; a new representative identification is determined according to the sequence of each of the prompt identifications in any group for display.

In an embodiment of the present disclosure, when the representative identification of the prompt identifications of any group is displayed, the display module 1130 may be further configured to: adjust, in response to a first preset operation on the representative identification, an attribute value of the virtual object indicated by the representative identification; determine, from the prompt identifications in any group other than the representative identification, the prompt identification having the minimum sequence value as a new representative identification; and display the new representative identification.

In an embodiment of the present disclosure, when the representative identification of the prompt identifications of any group is displayed, the display module 1130 may be further configured to adjust, in response to a second preset operation on the representative identification, the attribute value of the virtual object corresponding to each of the prompt identifications in the group corresponding to the representative identification, and cancel the display of the representative identification.

The specific details of each module in the foregoing apparatus have been described in detail in some embodiments of the method, and the details of the undisclosed solutions may refer to the content of the embodiments of the method part, and therefore will not be repeated.

Those skilled in the art will appreciate that various aspects of the present disclosure may be implemented as a system, method, or program product. Therefore, various aspects of the present disclosure may be specifically implemented in the following form: a complete hardware implementation, a complete software implementation (including firmware, microcode, etc.), or an implementation combining hardware and software, which may be collectively referred to as a "circuit", "a module" or "a system" here.

The present disclosure further provides a computer-readable storage medium on which a program product capable of implementing the method described in the present description is stored. In some possible embodiments, various aspects of the present disclosure may also be implemented in the form of a program product, which includes a program code, and when the program product runs on the terminal device, the program code is used to enable the terminal device to perform the steps of the various embodiments of the present disclosure described in the foregoing "method embodiments" part of the present description:

dividing a plurality of prompt identifications into at least one group; in each group, determining a sequence of each of the prompt identifications according to the position information of each of the prompt identifications and/or the virtual object corresponding to each of the prompt identifications in a game scene contained in the graphical user interface; and controlling each of the prompt identifications to display according to the group and the sequence of each of the prompt identifications.

In some embodiments, dividing the plurality of prompt identifications into at least one group includes: grouping the plurality of prompt identifications according to a preset rule, where the preset rule includes any one of the following: dividing the prompt identifications of each virtual object into one group; dividing the prompt identifications of the virtual object belonging to a same category into one group according to a category of the virtual object; and dividing the prompt identifications with a same identification category into one group according to the identification category of each of the prompt identifications.

In some embodiments, determining the sequence of each of the prompt identifications according to the position information of each of the prompt identifications and/or the virtual object corresponding to each of the prompt identifications in the game scene contained in the graphical user interface includes: determining a reference distance of each of the prompt identifications according to the position information of each of the prompt identifications and/or the virtual object corresponding to each of the prompt identifications in the game scene; sorting the reference distance of each of the prompt identifications in an ascending order, and determining the sequence of each of the prompt identifications according to the sequence obtained after sorting; where, the reference distance of each of the prompt identifications is determined by a distance between the prompt identifications and/or the virtual object corresponding to the prompt identifications and a preset position in the game scene.

In some embodiments, controlling each of the prompt identifications to display according to the group and the sequence of each of the prompt identifications includes: displaying each of the prompt identifications in each group as an information combination composed of the group and the sequence of the prompt identifications.

In some embodiments, when controlling each of the prompt identifications to display, the method further includes: displaying a representative identification of the prompt identifications of any group, where the representative identification includes a prompt identification having a minimum sequence value in the any group.

In some embodiments, the method further includes: when a number of the prompt identifications of any group is greater than a number threshold or a display scale of the game scene is less than a scale threshold, displaying the representative identification of the prompt identifications of any group.

In some embodiments, the game scene includes a screen captured by the virtual camera in the game scene, and after obtaining the sequence of each of the prompt identifications, the method further includes: when the position and/or the shooting angle of the virtual camera are changed, updating the sequence of each of the prompt identifications in the group corresponding to each representative identification according to the game scene captured by the changed virtual camera.

In some embodiments, when displaying the representative identification of the prompt identifications of any group, the method further includes: determining whether the representative identification is blocked or not, according to the position information of the representative identification in the game scene; when it is determined that the representative identification is blocked, performing sorting degradation processing on the prompt identification corresponding to the representative identification being blocked, and determining the sequence of each of the prompt identifications in the any group; and determining a new representative identification according to the sequence of each of the prompt identifications in any group for display.

In some embodiments, when displaying the representative identification of the prompt identifications of any group, the method further includes: in response to a first preset operation on the representative identification, adjusting an attribute value of the virtual object indicated by the representative identification; and determining, from the prompt identifications in any group other than the representative identification, the prompt identification having the minimum sequence value as a new representative identification, and displaying the new representative identification.

In some embodiments, when displaying the representative identification of the prompt identifications of any group, the method further includes: in response to a second preset operation on the representative identification, adjusting an attribute value of the virtual object corresponding to each of the prompt identifications in the group corresponding to the representative identification, and canceling display of the representative identification.

Through the above embodiments, on one hand, each of the prompt identifications is controlled to display according to the category and the sequence of each of the prompt identifications, so that the number of prompt identifications displayed in the game scene can be reduced, the repetition degree of the prompt identifications is reduced, the display area of the game scene is increased, the cognitive cost of the player on the prompt identification can be reduced, and the visual effect of displaying the game scene is improved. On the other hand, the plurality of prompt identifications are divided into at least one group, so that the prompt identifications can be integrated, and the information structure of the prompt identification is optimized. On another hand, the embodiment can be implemented through a program without the need for an additional interface carrier. It can provide an intuitive interface display effect for a player, and has higher portability and expandability.

Figure 12:
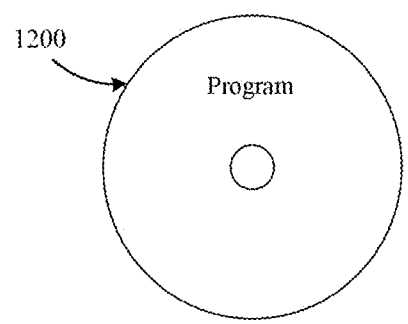
FIG. 12 shows a computer-readable storage medium for implementing the method according to an embodiment of the present disclosure.

Referring to FIG. 12, a program product 1200 for implementing the above method according to embodiments of the present disclosure is described, which may employ a portable compact disk read-only memory (CD-ROM) and includes program code, and may run on a terminal device, such as a personal computer. However, the program product of the present disclosure is not limited to this. In this document, the readable storage medium may be any tangible medium that includes or stores a program that may be used by or in connection with an instruction execution system, apparatus, or device.

Program product 1200 may employ any combination of one or more readable medium. The readable medium may be a readable signal medium or a readable storage medium. The readable storage medium may be, for example, but not limited to, an electrical, magnetic, optical, electromagnetic, infrared, or semiconductor system, apparatus, or device, or any combination of them. More specific examples of readable storage medium (non-exhaustive lists) include: an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of them.

The computer-readable signal medium may include a data signal propagated in a baseband or as part of a carrier, where readable program code is carried. Such propagated data signals may take a variety of forms, including, but not limited to, electromagnetic signals, optical signals, or any suitable combination of them. The readable signal medium may also be any readable medium other than a readable storage medium, and the readable medium may send, propagate, or transmit a program for being use by or in connection with an instruction execution system, apparatus, or device.

The program code contained on the readable medium may be transmitted with any suitable medium, including but not limited to wireless, wired, optical cable, RF, etc., or any suitable combination of the foregoing.

Program code for carrying out the operations of the present disclosure may be written in any combination of one or more programming languages, including object-oriented programming languages, such as Java, C++, etc., also including conventional procedural programming languages, such as "C" language or similar programming languages. The program code may be executed entirely on the user computing device, partly on the user device, as a stand-alone software package, partly on the user computing device and partly on the remote computing device, or entirely on the remote computing device or server. In situations involving a remote computing device, the remote computing device may be connected to a user computing device through any type of network, including a local area network (LAN) or a wide area network (WAN), or may be connected to an external computing device (e.g., be connected to via the Internet using an Internet service provider).

The present disclosure further provides an electronic device capable of implementing the foregoing method, which may be the terminal device having a display screen. The electronic device 1300 according to the embodiments of the present disclosure will be described below with reference to FIG. 13. The electronic device 1300 shown in FIG. 13 is only an example and should not bring any limitations on the function or use scope of the embodiments of the present disclosure.

Figure 13:
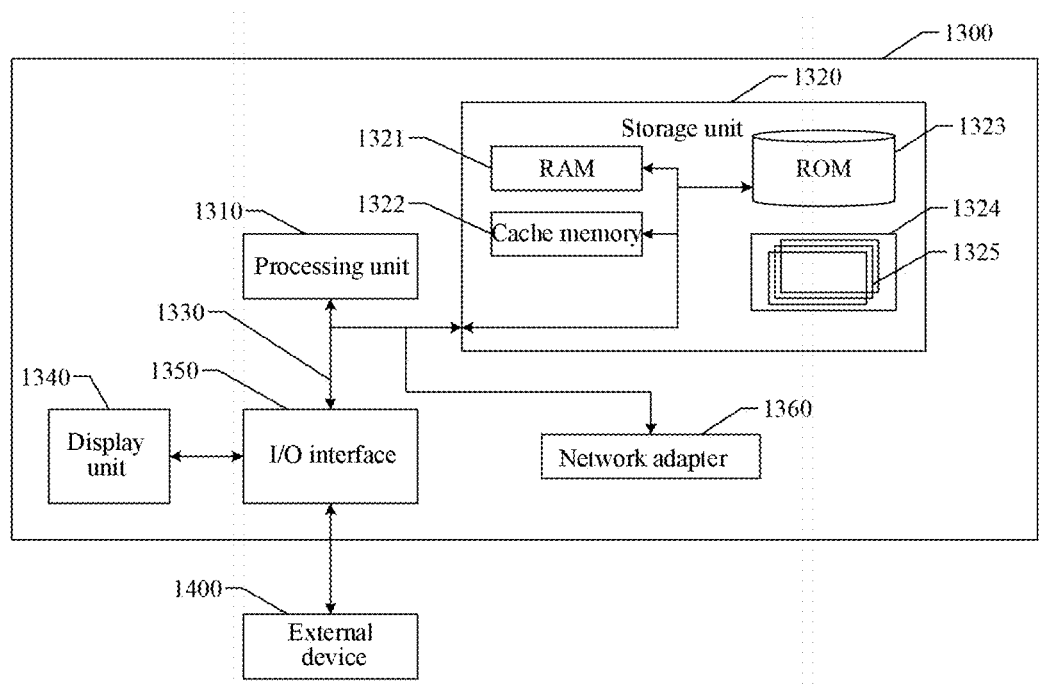
FIG. 13 shows an electronic device for implementing the method according to an embodiment of the present disclosure.

As shown in FIG. 13, the electronic device 1300 may be represented in the form of a general-purpose computing device. The components of the electronic device 1300 may include, but are not limited to: the at least one processing unit 1310, the at least one storage unit 1320, the bus 1330 connecting different system components (including the storage unit 1320 and the processing unit 1310), and the display unit 1340.

Among them, the storage unit 1320 stores with a program code, and the program code may be executed by the processing unit 1310, so that the processing unit 1310 executes the steps of the various embodiments according to the present disclosure described in the foregoing "method embodiments" part of the present description:

dividing a plurality of prompt identifications into at least one group; in each group, determining a sequence of each of the prompt identifications according to the position information of each of the prompt identifications and/or the virtual object corresponding to each of the prompt identifications in a game scene contained in the graphical user interface; and controlling each of the prompt identifications to display according to the group and the sequence of each of the prompt identifications.

In some embodiments, dividing the plurality of prompt identifications into at least one group includes: grouping the plurality of prompt identifications according to a preset rule, where the preset rule includes any one of the following: dividing the prompt identifications of each virtual object into one group; dividing the prompt identifications of the virtual object belonging to a same category into one group according to a category of the virtual object; and dividing the prompt identifications with a same identification category into one group according to the identification category of each of the prompt identifications.

In some embodiments, determining the sequence of each of the prompt identifications according to the position information of each of the prompt identifications and/or the virtual object corresponding to each of the prompt identifications in the game scene contained in the graphical user interface includes: determining a reference distance of each of the prompt identifications according to the position information of each of the prompt identifications and/or the virtual object corresponding to each of the prompt identifications in the game scene; sorting the reference distance of each of the prompt identifications in an ascending order, and determining the sequence of each of the prompt identifications according to the sequence obtained after sorting; where, the reference distance of each of the prompt identifications is determined by a distance between the prompt identifications and/or the virtual object corresponding to the prompt identifications and a preset position in the game scene.

In some embodiments, controlling each of the prompt identifications to display according to the group and the sequence of each of the prompt identifications includes: displaying each of the prompt identifications in each group as an information combination composed of the group and the sequence of the prompt identifications.

In some embodiments, when controlling each of the prompt identifications to display, the method further includes: displaying a representative identification of the prompt identifications of any group, where the representative identification includes a prompt identification having a minimum sequence value in the any group.

In some embodiments, the method further includes: when a number of the prompt identifications of any group is greater than a number threshold or a display scale of the game scene is less than a scale threshold, displaying the representative identification of the prompt identifications of any group.

In some embodiments, the game scene includes a scene captured by the virtual camera in the game scene, and after obtaining the sequence of each of the prompt identifications, the method further includes: when the position and/or the shooting angle of the virtual camera are changed, updating the sequence of each of the prompt identifications in the group corresponding to each representative identification according to the game scene captured by the changed virtual camera.

In some embodiments, when displaying the representative identification of the prompt identifications of any group, the method further includes: determining whether the representative identification is blocked or not, according to the position information of the representative identification in the game scene; when it is determined that the representative identification is blocked, performing sorting degradation processing on the prompt identification corresponding to the representative identification being blocked, and determining the sequence of each of the prompt identifications in the any group; and determining a new representative identification according to the sequence of each of the prompt identifications in any group for display.

In some embodiments, when displaying the representative identification of the prompt identifications of any group, the method further includes: in response to a first preset operation on the representative identification, adjusting an attribute value of the virtual object indicated by the representative identification; and determining, form the prompt identifications in any group other than the representative identification, the prompt identification having the minimum sequence value as a new representative identification, and displaying the new representative identification.

In some embodiments, when displaying the representative identification of the prompt identifications of any group, the method further includes: in response to a second preset operation on the representative identification, adjusting an attribute value of the virtual object corresponding to each of the prompt identifications in the group corresponding to the representative identification, and canceling display of the representative identification.

Through the above embodiments, on one hand, each of the prompt identifications is controlled to display according to the category and the sequence of each of the prompt identifications, so that the number of prompt identifications displayed in the game scene can be reduced, the repetition degree of the prompt identifications is reduced, the display area of the game scene is increased, the cognitive cost of the player on the prompt identification can be reduced, and the visual effect of displaying the game scene is improved. On the other hand, the plurality of prompt identifications are divided into at least one group, so that the prompt identifications can be integrated, and the information structure of the prompt identification is optimized. On another hand, the embodiment can be implemented through a program without the need for an additional interface carrier. It can provide an intuitive interface display effect for a player, and has higher portability and expandability.

The storage unit 1320 may include a readable medium in the form of a volatile memory unit, such as a random access memory unit (RAM) 1321 and/or a cache memory storage unit 1322, and may further include a read-only memory unit (ROM) 1323.

The storage unit 1320 may also include a program/utility 1324 having a set of (at least one) program module 1325. Such program module 1325 includes, but is not limited to: an operating system, one or more applications, other program modules, and program data. Each of these examples or some combination of them may include an implementation of a network environment.

The bus 1330 may represent one or more of several types of bus structures, including a memory cell bus or a memory cell controller, a peripheral bus, a graphics acceleration port, a processing unit, or a local bus using any of a variety of bus structures.

The electronic device 1300 may also communicate with one or more external devices 1400 (e.g., a keyboard, a pointing device, a Bluetooth device, etc.), may also communicate with one or more devices that enable a user to interact with the electronic device 1300, and/or may communicate with any device (e.g., router, modem, etc.) that enables the electronic device 1300 to communicate with one or more other computing devices. Such communication may be performed by an input/output (I/O) interface 1350. In addition, the electronic device 1300 may communicate with one or more networks (e.g., a local area network (LAN), a wide area network (WAN), and/or a public network, such as the Internet) through the network adapter 1360. As shown in the figure, network adapter 1360 communicates with other modules of electronic device 1300 through bus 1330. It should be understood that although not shown in the figure, other hardware and/or software modules may be used in conjunction with electronic device 1300, including but not limited to: microcode, device drivers, redundant processing units, external disk drive arrays, RAID systems, tape drivers, and data backup storage systems, etc.

The present disclosure may have the following beneficial effects:

According to the method for display control in the game, the apparatus for display control in the game, the computer-readable storage medium and the electronic device of the embodiments, the plurality of prompt identifications can be divided into at least one group; in each group, the sequence of each of the prompt identifications is determined according to the position information of each of the prompt identifications or the virtual object corresponding to each of the prompt identifications in the game scene contained in the graphical user interface, and each of the prompt identifications is controlled to display according to the group and the sequence of each of the prompt identifications. On one hand, each of the prompt identifications is controlled to display according to the category and the sequence of each of the prompt identifications, so that the number of prompt identifications displayed in the game scene can be reduced, the repetition degree of the prompt identifications is reduced, the display area of the game scene is increased, the cognitive cost of the player on the prompt identification can be reduced, and the visual effect of displaying the game scene is improved. On the other hand, the plurality of prompt identifications are divided into at least one group, so that the prompt identifications can be integrated, and the information structure of the prompt identification is optimized. On another hand, the embodiments can be implemented through a program without the need for an additional interface carrier. It can provide an intuitive interface display effect for the player, and has higher portability and expandability.

It should be noted that although several modules or units of a device for action execution are mentioned in the above detailed description, such division is not mandatory. Indeed, according to embodiments of the present disclosure, the features and functions of two or more modules or units described above may be concretized in one module or unit. Conversely, the features and functions of one module or unit described above may be further divided into a plurality of modules or units for concretization.

Furthermore, the above drawings are merely illustrative of the processes included in the method according to embodiments of the present disclosure, and are not intended to be limiting. It is easy to understand that the processes shown in the above drawings do not indicate or limit the chronological order of these processes. In addition, it is also easy to understand that these processes may be performed, for example, in multiple modules synchronously or asynchronously.

Through the description of the above embodiments, those skilled in the art would easily understand that the embodiments described here may be implemented by software, or may be implemented by software in combination with necessary hardware. Therefore, the technical solution according to embodiments of the present disclosure may be embodied in the form of a software product, and the software product may be stored in a non-volatile storage medium (which may be a CD-ROM, a USB flash disk, a mobile hard disk, etc.) or on a network, and may include several instructions to enable a computing device (which may be a personal computer, a server, a terminal device, or a network device, etc.) to perform the method according to embodiments of the present disclosure.

Other embodiments of the present disclosure will be apparent to those skilled in the art from consideration of the description and practice of the invention disclosed here. The present disclosure is intended to cover any variations, uses, or adaptations of the present disclosure following the general principles of the present disclosure and including common knowledge or conventional technical means in the art not disclosed in the present disclosure. The description and embodiments are considered as examples only, with a true scope and spirit of the disclosure being indicated by the claims.

What is claimed is:

1. A method for display control in a game, comprising:
    dividing, by a terminal device with a graphical user interface, at least one prompt identification into at least one group, wherein the graphical user interface displays at least one virtual object and at least one prompt identification respectively associated with a virtual object, and a prompt identification is displayed in vicinity of a corresponding virtual object;
    determining, in a group, a sequence of a prompt identification according to position information of the prompt identification or the virtual object corresponding to the prompt identification in a game scene contained in the graphical user interface; and
    controlling the prompt identification to display according to the group and the sequence of the prompt identification.

2. The method according to claim 1, wherein dividing the at least one prompt identification into at least one group comprises:
    grouping the at least one prompt identification according to a preset rule, wherein the preset rule comprises any one of:
    dividing the prompt identification of the virtual object into one group;
    dividing the prompt identification of the virtual object belonging to a same category into one group according to a category of the virtual object; and
    dividing the prompt identification with a same identification category into one group according to an identification category of the prompt identification.

3. The method according to claim 1, wherein determining the sequence of the prompt identification according to the position information of the prompt identification or the virtual object corresponding to the prompt identification in the game scene contained in the graphical user interface comprises:
    determining a reference distance of the prompt identification according to the position information of the prompt identification or the virtual object corresponding to the prompt identification in the game scene;
    sorting the reference distance of the prompt identification in an ascending order, and determining the sequence of the prompt identification;
    wherein the reference distance of the prompt identification is determined by a distance between the prompt identification or the virtual object corresponding to the prompt identification and a preset position in the game scene.

4. The method according to claim 1, wherein controlling the prompt identification to display according to the group and the sequence of the prompt identification comprises:
    displaying the prompt identification in the group as an information combination composed of the group and the sequence of the prompt identifications.

5. The method according to claim 1, wherein controlling the prompt identification to display further comprises:
    displaying a representative identification of the prompt identification of the group;
    wherein the representative identification comprises a prompt identification having a minimum sequence value in the group.

6. The method according to claim 5, wherein the method further comprises:
    in response to determining that a number of the prompt identification of the group is greater than a number threshold or a display scale of the game scene is less than a scale threshold, displaying the representative identification of the prompt identification of the group.

7. The method according to claim 5, wherein the game scene comprises a scene captured by a virtual camera in the game scene, and wherein displaying the representative identification of the prompt identification of the group further comprises:
    in response to determining that a position or a shooting angle of the virtual camera is changed, updating the sequence of the prompt identification in the group corresponding to the representative identification according to the game scene captured by a changed virtual camera.

8. The method according to claim 5, wherein displaying the representative identification of the prompt identification of the group further comprises:
  determining whether the representative identification is blocked according to position information of the representative identification in the game scene;
  in response to determining that the representative identification is blocked, performing sorting degradation processing on the prompt identification corresponding to the representative identification being blocked, and determining the sequence of the prompt identification in the group; and
  determining a new representative identification according to the sequence of the prompt identification in the group for display.

9. The method according to claim 5, wherein displaying the representative identification of the prompt identification of the group further comprises:
  adjusting, in response to a first preset operation on the representative identification, an attribute value of the virtual object corresponding to the representative identification; and
  determining, from the prompt identification in the group other than the representative identification, a prompt identification having a minimum sequence value as a new representative identification, and displaying the new representative identification.

10. The method according to claim 5, wherein displaying the representative identification of the prompt identification of the group further comprises:
  adjusting, in response to a second preset operation on the representative identification, an attribute value of the virtual object corresponding to the prompt identification in the group corresponding to the representative identification, and canceling display of the representative identification.

11. The method according to claim 1, wherein dividing the at least one prompt identification into at least one group further comprises:
  dividing the prompt identification of the virtual object in a certain region into one group according to a position of the virtual object in the game scene.

12. The method according to claim 1, wherein the position information of the prompt identification in the game scene comprises coordinate information of the prompt identification in the game scene.

13. The method according to claim 1, wherein determining the sequence of the prompt identification according to the position information of the prompt identification or the virtual object corresponding to the prompt identification in the game scene contained in the graphical user interface comprises:
  obtaining the position information of the prompt identification or the virtual object corresponding to the prompt identification in the game scene;
  obtaining a distance between the position of the prompt identification or the virtual object corresponding to the prompt identification and a certain fixed point in the game scene; and
  determining the sequence of the prompt identification.

14. The method according to claim 5, wherein displaying the representative identification of the prompt identification of the group further comprises:
  hiding display of the prompt identification in the group.

15. The method according to claim 9, wherein the attribute value of the virtual object comprises:
  a grade of the virtual object; or
  an attribute value of a virtual item corresponding to the virtual object.

16. The method according to claim 15, wherein the attribute value of the virtual item comprises a quantity, a yield or a life value of the virtual item.

17. The method according to claim 9, wherein the first preset operation comprises an operation of a player clicking the representative identification.

18. The method according to claim 10, wherein the second preset operation comprises an operation of a player dragging the representative identification to move in a certain direction.

19. A non-transitory computer-readable storage medium, having stored thereon a computer program, wherein, when the computer program is executed by a processor, a method for display control in a game is implemented, and the method comprises:
  dividing at least one prompt identification into at least one group, wherein a graphical user interface provided by a terminal device displays at least one virtual object and at least one prompt identification respectively associated with a virtual object, and a prompt identification is displayed in vicinity of a corresponding virtual object;
  determining, in a group, a sequence of a prompt identification according to position information of the prompt identification or the virtual object corresponding to the prompt identification in a game scene contained in the graphical user interface; and
  controlling the prompt identification to display according to the group and the sequence of the prompt identification.

20. An electronic device, comprising:
  a processor; and
  a memory, configured to store an executable instruction by the processor;
  wherein the processor is configured to execute a method for display control in a game by executing the executable instruction, and the method comprises:
  dividing at least one prompt identification into at least one group, wherein a graphical user interface provided by the electronic device displays at least one virtual object and at least one prompt identification respectively associated with a virtual object, and a prompt identification is displayed in vicinity of a corresponding virtual object;
  determining, in a group, a sequence of a prompt identification according to position information of the prompt identification or the virtual object corresponding to the prompt identification in a game scene contained in the graphical user interface; and
  controlling the prompt identification to display according to the group and the sequence of the prompt identification.

* * * * *